United States Patent [19]
Onoda et al.

[11] Patent Number: 5,988,726
[45] Date of Patent: *Nov. 23, 1999

[54] VEHICULAR REAR SEAT

[75] Inventors: Keisuke Onoda, Higashiura; Kazunori Hashimoto, Toyota; Yorisuke Matsufuji, Yokohama, all of Japan

[73] Assignees: Takashimaya Nippatsy Kogyo Co., Ltd.; Toyota Jidosha Kabushiki Kaisha, both of Toyota; NHK Sping Co., Ltd., Yokohama, all of JPX

[ * ] Notice: This patent issued on a continued prosecution application filed under 37 CFR 1.53(d), and is subject to the twenty year patent term provisions of 35 U.S.C. 154(a)(2).

[21] Appl. No.: 08/857,479

[22] Filed: May 16, 1997

[30] Foreign Application Priority Data

May 21, 1996 [JP] Japan ..................................... 8-125798

[51] Int. Cl.⁶ ........................................................ B60N 2/02
[52] U.S. Cl. ........................................... 296/65.05; 296/69
[58] Field of Search .............................. 296/65.05, 65.06, 296/65.09, 65.11, 65.13, 65.14, 65.16, 69, 65.01; 297/283.1, 236, 237, 335, 336, 451.16, 452.98

[56] References Cited

U.S. PATENT DOCUMENTS

| | | | |
|---|---|---|---|
| 2,152,505 | 3/1939 | Stuart et al. | 296/65.09 |
| 3,449,012 | 6/1969 | Caron . | |
| 4,133,556 | 1/1979 | Glinski | 296/65.09 |
| 4,475,763 | 10/1984 | Hamatani et al. | 296/65.09 |
| 4,512,609 | 4/1985 | Parsson . | |
| 4,637,653 | 1/1987 | Yoshida et al. | 296/65.05 |
| 5,044,683 | 9/1991 | Parsson . | |
| 5,133,589 | 7/1992 | Kimura | 296/65.09 |
| 5,240,302 | 8/1993 | Yoshida et al. . | |
| 5,248,178 | 9/1993 | Brambilla | 296/65.09 |
| 5,558,386 | 9/1996 | Tilly et al. | 296/65.05 |
| 5,605,368 | 2/1997 | Noma et al. | 296/69 |
| 5,641,202 | 6/1997 | Rus | 296/65.09 |
| 5,658,046 | 8/1997 | Rus | 296/65.09 |
| 5,702,145 | 12/1997 | Fowler et al. | 296/65.05 |

FOREIGN PATENT DOCUMENTS

| | | |
|---|---|---|
| 0 769 411 A2 | 4/1997 | European Pat. Off. . |
| 1499448 | 1/1968 | France . |
| 27 25 001 | 12/1977 | Germany . |
| 3-189245 | 8/1991 | Japan . |
| 3-125625 | 12/1991 | Japan . |
| 5-85242 | 4/1993 | Japan . |
| 1 553 015 | 9/1979 | United Kingdom . |

*Primary Examiner*—Joseph D. Pape
*Assistant Examiner*—Kiran Patel
*Attorney, Agent, or Firm*—Oliff & Berridge, PLC

[57] ABSTRACT

A simple-structure vehicular rear seat wherein an upstanding seat cushion reliably receives and stops a luggage piece placed on a luggage supportive floor surface if the piece moves for any reason. When a seat back is laid down forward, the reverse surface of the seat back can be used as a luggage supportive floor surface. A seat cushion is supported on an elevated step portion of a stepped floor, and made up of a lower cushion and an upper cushion. The upper cushion is connected to the elevated step portion by a link-type connection mechanism that allows the upper cushion to be moved between a normal position where the upper cushion is supported on the lower cushion and an upstanding position where the reverse surface of the upper cushion abuts against and is supported by a front wall surface of the elevated step portion.

11 Claims, 3 Drawing Sheets

VEHICULAR REAR SEAT

INCORPORATION BY REFERENCE

The entire disclosure of Japanese Patent Application No. Hei 8-125798 filed May 21, 1996, including the specification, drawings and abstract, is incorporated herein by reference in its entirety.

BACKGROUND OF THE INVENTION

1. Field of the Invention

The present invention relates to a vehicular rear seat of the type including a seat back provided at a rear portion of a seat cushion supported on an elevated step portion of a stepped floor in such a fashion that the seat back is capable of being stood up and laid down. When the seat back is laid down, the reverse surface of the seat back can be used as a luggage supportive floor surface.

2. Description of the Related Art

Various vehicular rear seats are known in which a seat back is provided at a rear portion of a seat cushion supported on an elevated step portion of a stepped floor such that the seat back is capable of being stood up and laid down, and in which when the seat cushion is swung up with a front portion thereof facing down and the seat back is laid down forward, the reverse surface of the seat back can be used as a luggage supportive floor surface, for example, as disclosed in Japanese Patent Laid-Open No. Hei 3-189245.

However, this type of conventional vehicular rear seat has problems as follows. For example, when the seat cushion is swung up with the front portion thereof facing down, a space is left between the seat cushion and the front wall surface of the elevated step portion of the floor so that the seat cushion is not firmly maintained in a precise upstanding portion. If quick or panic braking is applied or the vehicle receives an impact from the forward direction so that a luggage piece moves forward on the luggage supportive floor surface, then the luggage piece, if it is small, may fall into the space and, if it is large, may apply a large load to a front seat via the seat cushion held in the upstanding state, thus impeding driving. To eliminate such problems, it becomes necessary to provide reinforcing members, such as a belt, a link or the like, for fixing the seat cushion in the upstanding state, thus causing another problem of structure complication.

SUMMARY OF THE INVENTION

Accordingly, it is an object of the present invention to provide a vehicular rear seat wherein when a seat back provided at a rear portion of a seat cushion is laid down forward to use the rear surface of the seat back as a luggage supportive floor surface, an upstanding seat cushion member reliably receives and stops a luggage piece placed on the luggage supportive floor surface if the luggage piece moves forward for any reason, thereby eliminating the danger of transmitting a large load to a front seat and the danger that the luggage piece will fall in the front of the luggage supportive floor surface even if it is a small piece and, further, no additional reinforcing member is required for retaining the seat cushion in a stable upstanding state, thus allowing simple structure design and low-cost production.

According to the present invention, there is provided a vehicular rear seat including a seat back provided at a rear portion of a seat cushion supported on an elevated step portion of a stepped floor such that the seat back is capable of assuming a raised position and a lowered position in which a reverse surface of the seat back becomes a luggage supportive floor surface. The seat cushion comprises a lower cushion supported on an upper surface of the elevated step portion, an upper cushion capable of being laid on the lower cushion, and a link-type connection mechanism changeable between a normal state where the upper cushion is supported on the lower cushion and an upstanding state where the upper cushion is swung up with a front portion thereof facing down and where a reverse surface of the upper cushion abuts against and is supported on a front wall surface of the elevated step portion of the stepped floor.

The link-type connection mechanism may comprise a first link connected at an end thereof to the stepped floor and a second link connected at an end thereof to the other end of the first link, the other end of the second link being connected to a seat frame. When the upper cushion is in the upstanding state, the first link and the second link may be received in a cutout formed in a front portion of the lower cushion of the seat cushion, in such a fashion that the first link and the second link become substantially linear along a floor surface.

When the seat back has been laid down forward to use its reverse surface as a luggage supportive floor surface, the upper cushion will reliably receive and stop a luggage piece and prevent transmission of a large load to the front seat if the luggage piece moves forward on the luggage supportive floor surface. The rear seat of the present invention also substantially eliminates the danger that a luggage piece will fall into a space in front of the floor supportive floor surface even if it is a small piece. Moreover, since the rear seat requires no additional reinforcing member for stably holding the seat cushion in the upstanding state, the construction can be simplified and the production cost can be reduced.

BRIEF DESCRIPTION OF THE DRAWINGS

The foregoing and further objects, features and advantages of the present invention will become apparent from the following description of preferred embodiments with reference to the accompanying drawings, wherein like numerals are used to represent like elements and wherein.

DETAILED DESCRIPTION OF PREFERRED EMBODIMENTS

A preferred embodiment of the present invention will be described in detail hereinafter with reference to the accompanying drawings. According to the embodiment, each of the seat back and the seat cushion of a vehicular rear seat is divided into two parts in width at 6:4, i.e., a 60%–40% split.

Figure 1:
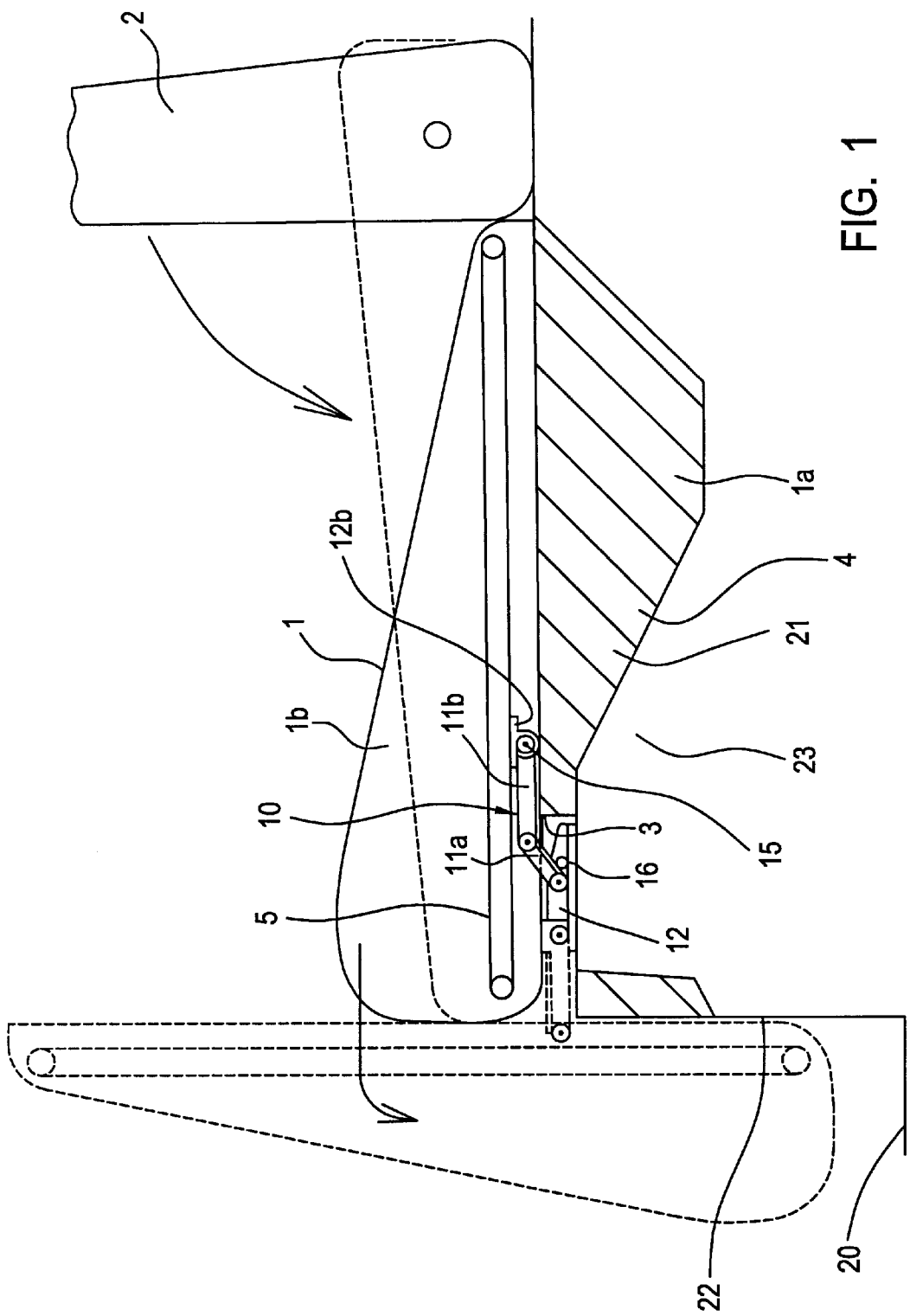
FIG. 1 is an elevation of a preferred embodiment of the vehicular rear seat of the present invention.
Figure 3:
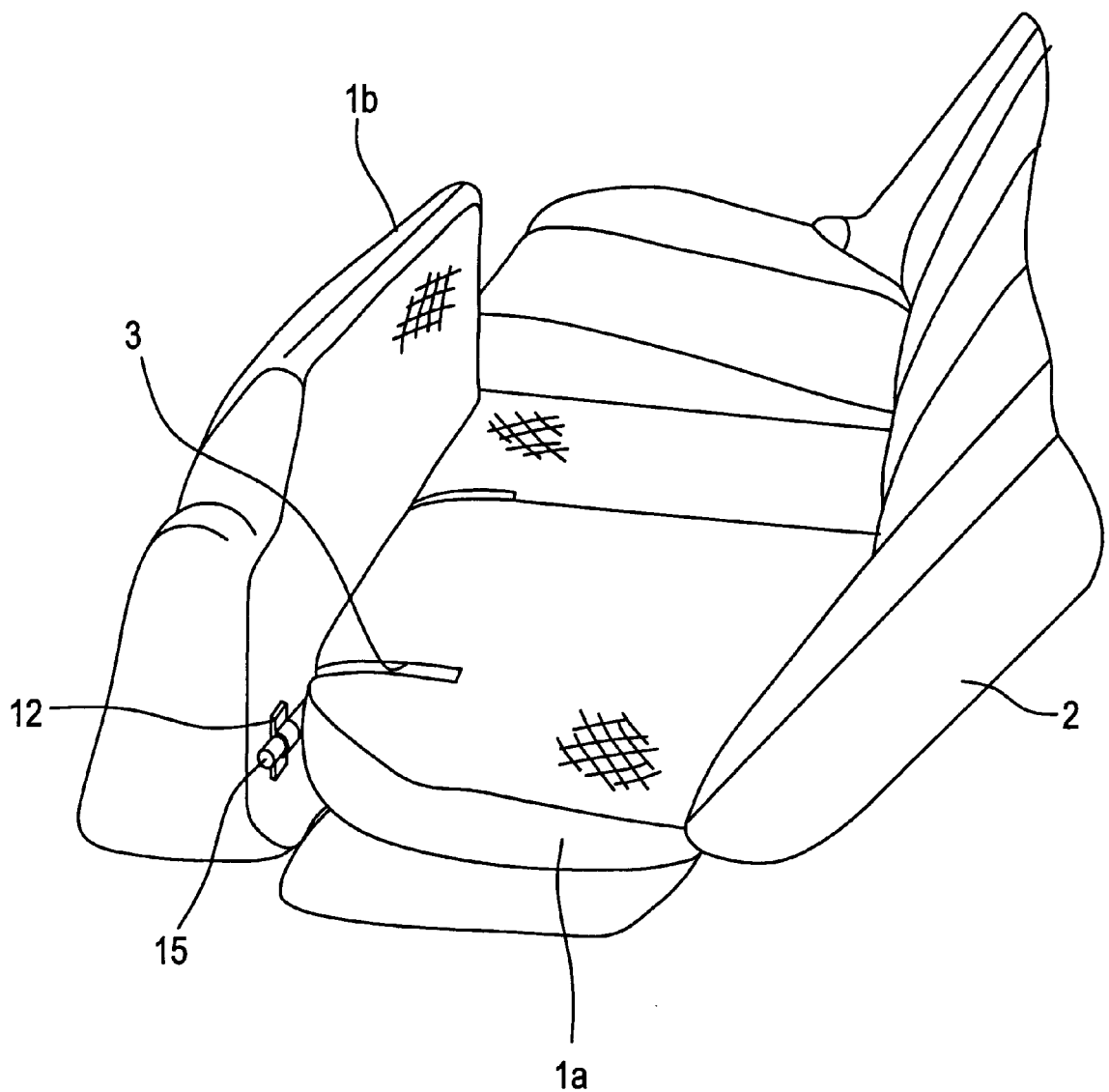
FIG. 3 is a perspective view of a rear seat, illustrating an upstanding state of a second seat cushion.

Referring to FIG. 1, a seat cushion 1 is supported on an elevated step portion 21 of a stepped floor 20, and a seat back 2 is provided at a rear portion of the seat cushion 1 in such a manner that the seat back 2 is capable of being moved between raised and lowered positions. Each of the seat cushion 1 and the seat back 2 comprises a wide part and a narrow part (divided in width at 6:4) disposed side by side as shown in FIG. 3. The description below will be mainly made in conjunction with the wide parts since the wide and narrow parts have substantially the same construction, with the exception of width. When the seat back 2 is laid down forward, the reverse surface of the seat back 2 can be used as a luggage supportive floor surface. The basic structure thereof is substantially the same as that of a seat back according to the conventional art.

The seat cushion 1 has a double-layer structure in which an upper cushion 1b is laid over a lower cushion 1a supported on an upper surface of the elevated step portion 21 of the floor 20. The reverse surface of the upper cushion 1b and the lower cushion 1a are covered with the same carpet material as used for the floor. Underneath the bottom of the lower cushion 1a, recesses 4 are formed on the elevated step portion 21 of the stepped floor 20 corresponding to connection mechanism mounting protrusions 23 extending in the fore-to-aft direction near opposite side ends of a front half portion of the elevated step portion 21. Portions of the lower cushion 1a corresponding to the connection mechanism mounting protrusions 23 have reduced thicknesses. Each thin portion of the lower cushion 1a has a connection mechanism mounting cutout 3 extending in the fore-to-aft direction to the front edge of the lower cushion 1a, which substantially coincides with the front edge of the elevated step portion 21.

Reference numeral 10 represents a link-type connection mechanism that connects the upper cushion 1b to the elevated step portion 21 of the stepped floor 20. The link-type connection mechanism 10 enables changing between two states, that is, a normal state where the lower surface of the upper cushion 1b is supported on the upper surface of the lower cushion 1a, and an upstanding state where the upper cushion 1b is swung up with its front portion facing down and the reverse face of the front portion of the upper cushion 1b abuts against and is supported on a front wall surface 22 of the elevated step portion 21 of the stepped floor 20.

Figure 2:
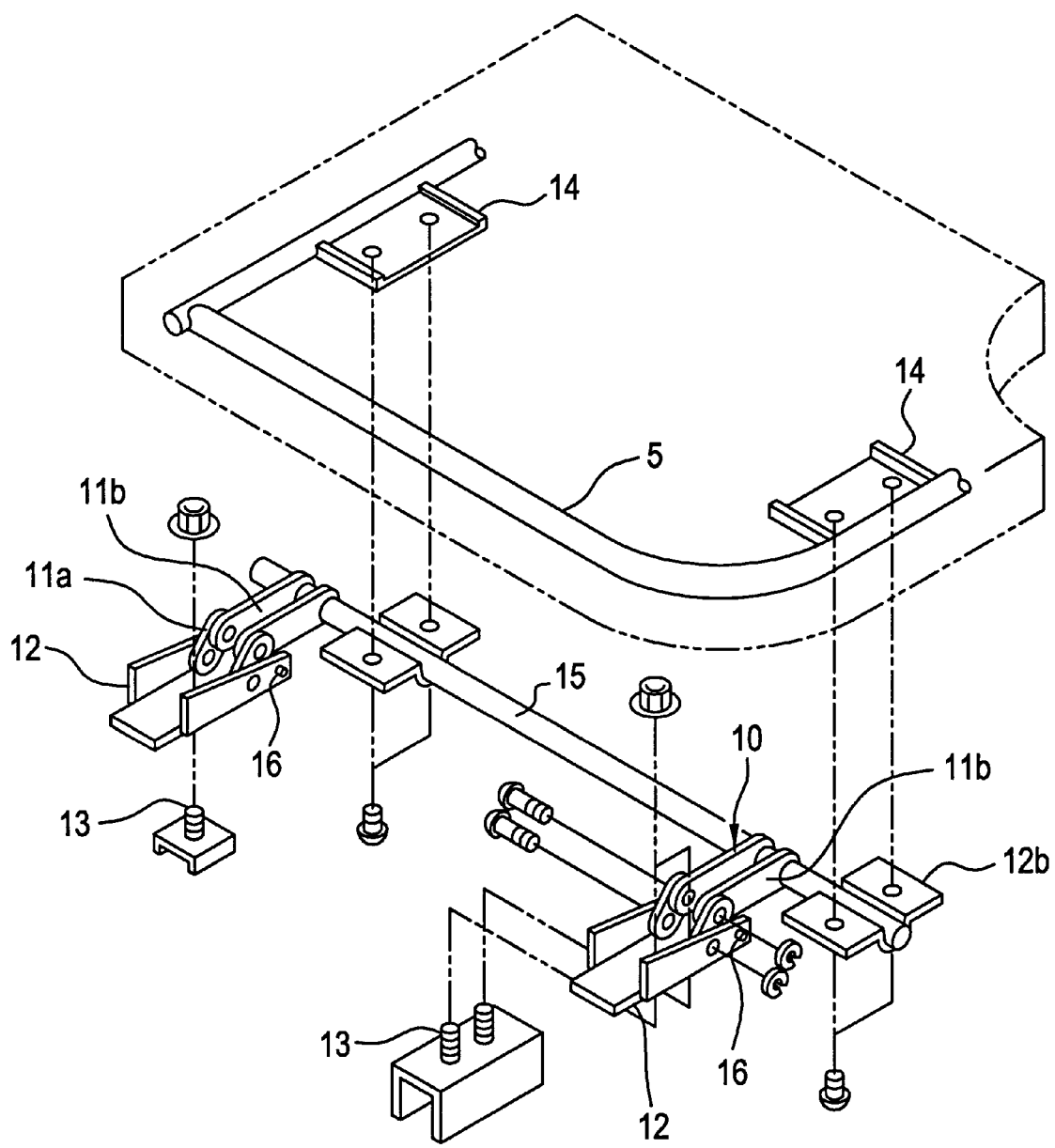
FIG. 2 is an exploded perspective view of the connection mechanism shown in FIG. 1.

The link-type connection mechanism 10, as shown in FIG. 2, comprises brackets 12 each fixed to a top portion of the corresponding protrusion 23 by stud bolts 13, first links 11a, each of which is rotatably connected at an end thereof to the corresponding bracket 12, and second links 11b, each of which is rotatably connected at an end thereof to the other end of the corresponding first link 11a. The other end of each second link 11b is connected to a lever 15 rotatably supported to mounting plates 14 provided on a seat frame 5 by a bracket 12b, as shown in FIG. 2. The connection mechanism 10 is constructed so that when the upper cushion 1b is turned into the upstanding state, the pairs of first link 11a and the second link 11b are received in the corresponding cutouts 3 formed in the front portion of the lower cushion 1a while extending linearly along a floor surface. Thereby, the operability and stability at the time of swinging up the upper cushion 1b are improved. Stoppers 16 that restrict the upper cushion 1b to a predetermined position when the upper cushion 1b is in the normal state, where the upper cushion 1b is supported on the lower cushion 1a with the lower surface of the upper cushion 1b facing the upper surface of the lower cushion 1a.

With this construction, the rear seat is normally used in the normal state, as indicated by solid lines in FIG. 1, where the lower face of the upper cushion 1b is supported on the upper face of the lower cushion 1a, and when necessary, the upper cushion 1b is swung up with a front portion thereof facing down and the seat back 2 is laid down forward so that the reverse side of the seat back 2 may be used as a luggage supportive floor surface. According to this embodiment, the upper cushion 1b is held in the upstanding state with the reverse face of the front portion of the upper cushion 1b abutting against and being supported on the front wall surface of the elevated step portion 21 of the stepped floor 20, and the upstanding state of the upper cushion 1b can be stably maintained. Therefore, if a luggage piece on the luggage supportive floor surface moves forward and hits the upstanding upper cushion 1b, the upper cushion 1b is reliably prevented from moving forward and giving an impact to the front seat. Moreover, since no space is formed between the upstanding upper cushion 1b and the front wall surface 22 of the elevated step portion 21, the embodiment eliminates an incident that a luggage piece falls through such a space if it is a small piece. Further, since the embodiment employs only a simple mechanism, that is, the link-type connection mechanism, without additional mechanism, the embodiment achieves an installation space reduction and a cost reduction.

While the present invention has been described with reference to preferred embodiments thereof, it is to be understood that the invention is not limited to the disclosed embodiment or constructions. To the contrary, the invention is intended to cover various modifications and equivalent arrangements included within the spirit and scope of the appended claims.

What is claimed is:

1. A vehicular rear seat including a seat back provided at a rear portion of a seat cushion, said seat cushion being supported on an elevated step portion of a stepped floor such that the seat back can assume a raised position and a lowered position in which a reverse surface of the seat back becomes a luggage supportive floor surface, the seat cushion comprising:

a lower cushion supported on an upper surface of the elevated step portion, an upper cushion capable of being laid on the lower cushion, and a link-type connection mechanism changeable between a normal state where the upper cushion is supported on the lower cushion and an upstanding state where the upper cushion is swung up with a front portion thereof facing down and where a reverse surface of the upper cushion abuts against and is supported on a front wall surface of the elevated step portion of the stepped floor.

2. A vehicular rear seat according to claim 1, wherein the link-type connection mechanism comprises a first link connected at an end thereof to the stepped floor and a second link connected at an end thereof to the other end of the first link, the other end of the second link being connected to a seat frame, and wherein, when the upper cushion is in the upstanding state, said first link and said second link are received in a cutout formed in a front portion of the lower cushion of the seat cushion, in such a fashion that said first link and said second link become substantially linear along a surface of the stepped floor.

3. A vehicular rear seat including a seat back provided at a rear portion of a seat cushion, said seat cushion being supported on an elevated stepped portion of a stepped floor such that the seat back can assume a raised position and a lowered position in which a reverse surface of the seat back becomes a luggage supportive floor surface, the seat cushion comprising:

a cushion supported on an upper surface of the elevated stepped portion; and a link-type connection mechanism changeable between a normal state in which the cushion is supported on the elevated stepped cushion and an upstanding state in which the cushion is swung up with a front portion thereof facing down, a reverse surface of the cushion abutting against and contacting a front wall surface of the elevated stepped portion of the stepped floor.

4. A vehicular rear seat according to claim 3, wherein the link-type connection mechanism is structured so that, in the upstanding state, the reverse surface of the cushion abuts against and contacts the front wall surface of the elevated step portion of the stepped floor even if a piece of luggage imparts a striking force on the reverse surface of the cushion.

5. A vehicular rear seat according to claim 1, wherein the link-type connection mechanism is structured so that, in the upstanding state, the reverse surface of the upper cushion abuts against and contacts the front wall surface of the elevated step portion of the stepped floor even if a piece of luggage imparts a striking force on the reverse surface of the upper cushion.

6. A vehicular rear seat according to claim 3, wherein the link-type connection mechanism comprises at least first and second links that reduce space necessary for movement of the seat cushion and that maintain a predetermined overlap portion between the reverse surface of the cushion and the front wall surface of the stepped portion of the stepped floor.

7. A vehicular rear seat according to claim 1, wherein the link-type connection mechanism comprises at least first and second links that reduce space necessary for movement of the upper cushion and that maintain a predetermined overlap between the reverse surface of the upper cushion and the front wall surface of the elevated step portion of the stepped floor.

8. A vehicular rear seat according to claim 3, wherein the link-type mechanism comprises at least first and second links positioned inward from the front wall surface and below the cushion.

9. A vehicular rear seat according to claim 1, wherein the link-type mechanism comprises at least first and second links positioned inward from the front wall surface and below the upper cushion.

10. A vehicular rear seat according to claim 3, wherein the cushion pivots about a point positioned inward from the front wall surface.

11. A vehicular rear seat according to claim 1, wherein the upper cushion pivots about a point positioned inward from the front wall surface.

* * * * *

UNITED STATES PATENT AND TRADEMARK OFFICE
CERTIFICATE OF CORRECTION

PATENT NO. : 5,988,726
DATED : November 23, 1999
INVENTOR(S) :
Keisuke Onoda, Kazunori Hashimoto, Yorisuke Matsufuji It is certified that error appears in the above-identified patent and that said Letters Patent is hereby corrected as shown below:

On the title page, item

[73] Assignee: change "Takashimaya Nippatsy Kogyo Co., Ltd.; Toyota Jidosha Kabushiki Kaisha, both of Toyota; NHK Spling Co., Ltd., Yokohama, all of JPX" to --Takashimaya Nippatsu Kogyo Co., Ltd.; Toyota Jidosha Kabushiki Kaisha, both of Toyota; NHK Spling, Co.,Ltd., Yokohama, all of Japan--.

Signed and Sealed this

First Day of August, 2000

Attest:

Q. TODD DICKINSON

*Attesting Officer*  *Director of Patents and Trademarks*